(12) United States Patent
Reinmuth

(10) Patent No.: US 8,347,721 B2
(45) Date of Patent: Jan. 8, 2013

(54) ACCELERATION SENSOR

(75) Inventor: Jochen Reinmuth, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 316 days.

(21) Appl. No.: 12/783,307

(22) Filed: May 19, 2010

(65) Prior Publication Data

US 2010/0300204 A1 Dec. 2, 2010

(30) Foreign Application Priority Data

May 26, 2009 (DE) .......................... 10 2009 026 462

(51) Int. Cl.
*G01P 15/125* (2006.01)
*G01P 15/00* (2006.01)

(52) U.S. Cl. ................................. 73/514.32; 73/514.36

(58) Field of Classification Search ............... 73/514.18, 73/514.32, 514.36
See application file for complete search history.

(56) References Cited

U.S. PATENT DOCUMENTS

| 5,488,864 | A * | 2/1996 | Stephan ..................... 73/514.32 |
| 6,230,566 | B1 * | 5/2001 | Lee et al. .................. 73/514.32 |
| 6,935,175 | B2 * | 8/2005 | Eskridge et al. ........... 73/514.32 |
| 7,610,809 | B2 * | 11/2009 | McNeil et al. ............. 73/514.32 |
| 8,096,182 | B2 * | 1/2012 | Lin et al. ................... 73/514.32 |
| 2008/0134785 | A1 * | 6/2008 | Pruetz ....................... 73/514.32 |

FOREIGN PATENT DOCUMENTS

| EP | 0 244 581 | 11/1987 |
| EP | 0 773 443 | 5/1997 |

* cited by examiner

*Primary Examiner* — Hezron E Williams
*Assistant Examiner* — David Z Huang
(74) *Attorney, Agent, or Firm* — Kenyon & Kenyon LLP

(57) ABSTRACT

A micromechanical acceleration sensor includes a substrate with a substrate surface arranged in one plane, a first counter-electrode arranged on the substrate surface, a second counter-electrode arranged on the substrate surface, and a rocking mass arranged above the first counter-electrode and the second counter-electrode. The rocking mass is in this case connected to the substrate via a torsion spring which permits tilting of the rocking mass about an axis of rotation. Further provided are a first compensation counter-electrode arranged on the substrate surface and a second compensation counter-electrode arranged on the substrate surface. In addition, a first compensation electrode is arranged above the first compensation counter-electrode and a second compensation electrode is arranged above the second compensation counter-electrode.

14 Claims, 4 Drawing Sheets

ACCELERATION SENSOR

RELATED APPLICATION INFORMATION

The present application claims priority to and the benefit of German patent application no. 10 2009 026 462.0, which was filed in Germany on Mar. 26, 2009, the disclosure of which is incorporated herein by reference.

FIELD OF THE INVENTION

The present invention relates to a micromechanical acceleration sensor and to a method for operating a micromechanical acceleration sensor.

BACKGROUND INFORMATION

Micromechanical acceleration sensors made from semiconductor substrates are known. It is further known to use, in the case of capacitive acceleration sensors having a detection direction perpendicular to a wafer plane, rocking electrodes which are based on a spring-mass system in which a movable seismic mass forms a plate capacitor with each of two counter-electrodes fixed to a substrate. The seismic rocking mass is in that case connected to the substrate via a torsion spring. If the mass of the seismic rocking electrode is distributed asymmetrically with respect to the torsion spring, an acceleration acting perpendicular to the substrate surface causes tilting of the rocking mass relative to the torsion spring. As a result, the capacitances of the two plate capacitors change with opposite signs. The changes in capacitance represent a measure of the magnitude of the acting acceleration. Similar acceleration sensors are discussed, for example, in patent specifications EP 0 773 443 B1 and EP 0 244 581 A1.

A disadvantage of such acceleration sensors is their sensitivity toward interference caused by mechanical stress. Such mechanical stress may, for example, consist of asymmetrical bending of the substrate induced by a housing of the acceleration sensor. Such an asymmetrical bending of the substrate leads to a change in the capacitances of the plate capacitors which is mistaken for acting acceleration.

SUMMARY OF THE INVENTION

An object of the exemplary embodiments and/or exemplary methods of the present invention is to provide an improved micromechanical acceleration sensor. That object is attained by an acceleration sensor having the features described herein. It is further an object of the exemplary embodiments and/or exemplary methods of the present invention to give an improved method for operating a micromechanical acceleration sensor. That object is attained by a method having the features described herein. Exemplary developments are described herein.

A micromechanical acceleration sensor according to the present invention includes a substrate with a substrate surface arranged in one plane, a first counter-electrode arranged on the substrate surface, a second counter-electrode arranged on the substrate surface and a rocking mass arranged above the first counter-electrode and the second counter-electrode. The rocking mass is in this case connected to the substrate via a torsion spring which permits tilting of the rocking mass about an axis of rotation. Further provided are a first compensation counter-electrode arranged on the substrate surface and a second compensation counter-electrode arranged on the substrate surface. In addition, a first compensation electrode is arranged above the first compensation counter-electrode and a second compensation electrode is arranged above the second compensation counter-electrode.

Advantageously, the first and second compensation electrodes do not as a first approximation react to an acceleration acting on the acceleration sensor. The first and second compensation electrodes react, however, to an asymmetrical bending of the substrate in a similar manner to the rocking mass. In that manner it is possible to distinguish the effects of an asymmetrical bending of the substrate from an acceleration and compensate for it. That advantageously permits the production of acceleration sensors that are markedly less sensitive to stress effects caused by a housing. That makes it possible to use types of housing that exert higher stress effects on the acceleration sensor but which in return are cheaper. For example, molded housings may be used instead of premolded housings.

Advantageously, the first compensation electrode and the second compensation electrode are rigidly connected to the substrate. That advantageously ensures that the first and second compensation electrodes do not as a first approximation move under the influence of an acceleration acting on the acceleration sensor.

The first counter-electrode may be electrically connected to the second compensation counter-electrode and the second counter-electrode is electrically connected to the first compensation counter-electrode. Such a complementary interconnection advantageously brings about automatic compensation for signal offsets caused by asymmetrical bending of the substrate.

Advantageously, the first compensation electrode and the second compensation electrode are configured symmetrically to each other in terms of a mirroring at the torsion spring. Especially good compensation for the effects of asymmetrical bending of the substrate may be achieved in that manner.

It is also advantageous for the first compensation counter-electrode and the second compensation counter-electrode to be configured symmetrically to each other in terms of a mirroring at the torsion spring. Advantageously, that too assists in providing a capacity to compensate well for the effects of asymmetrical bending of the substrate.

In accordance with a development of the micromechanical acceleration sensor, without an acceleration acting on the acceleration sensor a first electrical sensor capacitance between the rocking mass and the first counter-electrode is of approximately the same magnitude as a first electrical compensation capacitance between the second compensation electrode and the second compensation counter-electrode, and a second electrical sensor capacitance between the rocking mass and the second counter-electrode is of approximately the same magnitude as a second electrical compensation capacitance between the first compensation electrode and the first compensation counter-electrode. Advantageously, that too assists in providing a capacity to compensate well for the effects of an asymmetrical bending of the substrate.

The micromechanical acceleration sensor may be connectable to an evaluation circuit which is configured to calculate a difference between a sum of the first electrical sensor capacitance and the first electrical compensation capacitance and a sum of the second electrical sensor capacitance and the second electrical compensation capacitance. Advantageously, that difference represents a measure of an acceleration acting on the acceleration sensor perpendicular to the substrate surface.

In accordance with one embodiment of the micromechanical acceleration sensor, the first compensation electrode is connected to the substrate via a first post at an end of the first compensation electrode toward the torsion spring, and the second compensation electrode is connected to the substrate via a second post at an end of the second compensation electrode toward the torsion spring. Advantageously, such a suspension of the compensation electrodes close to the suspension of the torsion spring causes the compensation electrodes to react to an asymmetrical bending of the substrate in a similar manner to the rocking mass.

In accordance with another embodiment of the micromechanical acceleration sensor, the torsion spring, the first compensation electrode and the second compensation electrode are connected to the substrate at a common suspension post. Advantageously, in this embodiment an asymmetrical bending of the substrate has a particularly similar effect on the compensation electrodes to that on the rocking electrode.

The rocking mass partially may surround the first compensation electrode. An asymmetrical bending of the substrate in a first direction relative to the plane of the substrate surface may advantageously be completely compensated for in that manner.

A plurality of first counter-electrodes and/or a plurality of first compensation counter-electrodes may also be provided. It is then advantageously possible to compensate for asymmetrical bending of the substrate acting in all directions of the plane of the substrate surface.

A method according to the present invention for operating a micromechanical acceleration sensor has method steps for acquiring a first sum of the first electrical sensor capacitance and the first electrical compensation capacitance, for acquiring a second sum of the second electrical sensor capacitance and the second electrical compensation capacitance, for calculating a difference between the first sum and the second sum, and for determining a magnitude and a direction of an acceleration acting on the acceleration sensor on the basis of the amount and sign of the difference. This method advantageously allows the effects of an asymmetrical bending of the substrate on the acceleration sensor to be differentiated from an acceleration acting on the acceleration sensor.

The exemplary embodiments and/or exemplary methods of the present invention will be described in detail with reference to the accompanying Figures, in which consistent reference characters are used for identical parts or parts having an identical action.

DETAILED DESCRIPTION

Figure 1:
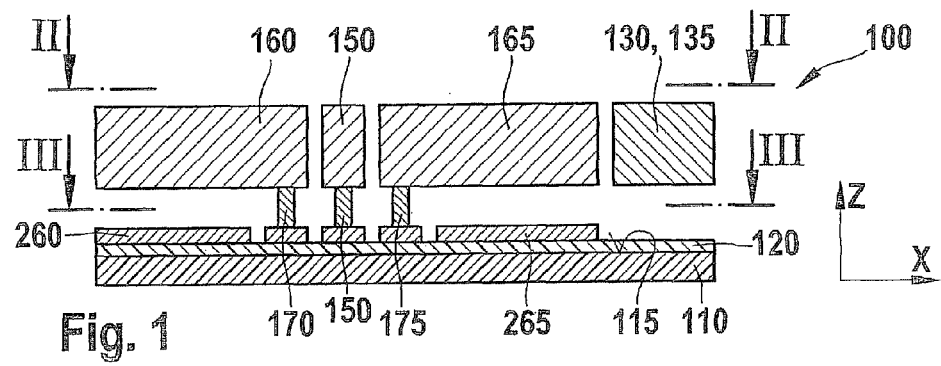
FIG. 1 shows a section through a micromechanical acceleration sensor in accordance with a first embodiment.
Figure 2:
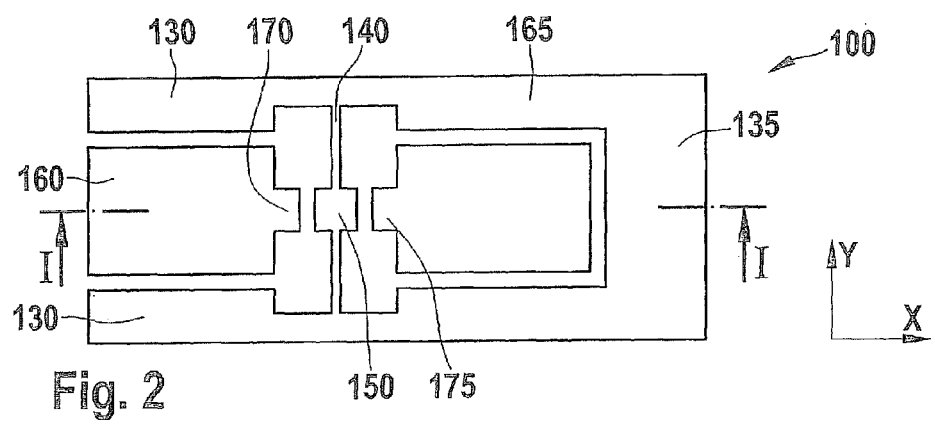
FIG. 2 is a plan view of the acceleration sensor of the first embodiment.

FIG. 1 shows a section through an acceleration sensor 100.
FIG. 2 is a plan view of acceleration sensor 100 of FIG. 1.

Figure 3:
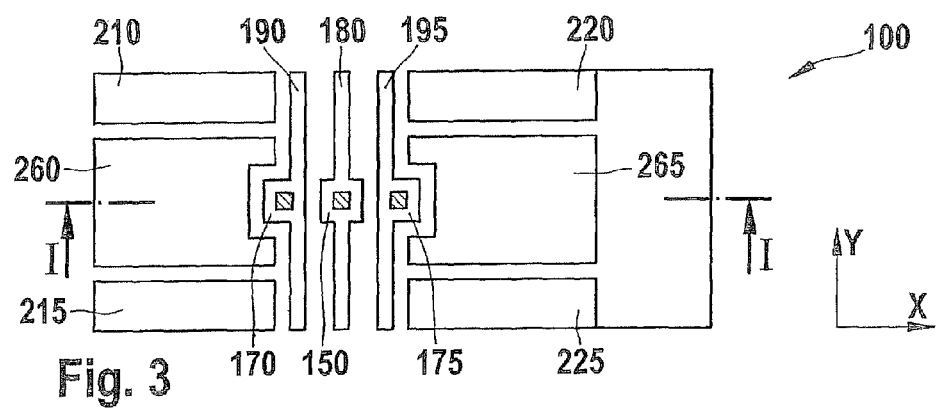
FIG. 3 shows a further section through the acceleration sensor of the first embodiment.

FIG. 3 shows a section through acceleration sensor 100, parallel to substrate surface 115. Acceleration sensor 100 includes a substrate 110 with a substrate surface 115 arranged in an x-y plane.

Substrate 110 may, for example, be a silicon substrate. Arranged on substrate surface 115 there is an insulation layer 120. Insulation layer 120 may, for example, consist of a silicon oxide.

In FIG. 3 it is possible to see that a first counter-electrode 210, a second counter-electrode 220, a third counter-electrode 215, a fourth counter-electrode 225, a first compensation counter-electrode 260 and a second compensation counter-electrode 265 are arranged on insulation layer 120. Counter-electrodes 210, 215, 220, 225 and compensation counter-electrodes 260, 265 consist of a conductive material, for example doped polysilicon. First counter-electrode 210 is arranged in y direction on a first side beside first compensation counter-electrode 260, and third counter-electrode 215 is arranged in y direction on a second side beside first compensation counter-electrode 260. Second counter-electrode 220 is arranged in y direction on a first side beside second compensation counter-electrode 265, and fourth counter-electrode 225 is arranged in y direction on a second side beside second compensation counter-electrode 265.

First counter-electrode 210, first compensation counter-electrode 260 and third counter-electrode 215 are configured mirror-symmetrically to second counter-electrode 220, second compensation counter-electrode 265 and fourth counter-electrode 225 in terms of a mirroring at a mirror plane parallel to the y axis.

In addition, a first supply line 190, a rocker supply line 180 and a second supply line 195 are arranged on insulation layer 120, which supply lines each extend parallel to the y direction between first compensation counter-electrode 260 and second compensation counter-electrode 265. First supply line 190 lies closer to first compensation counter-electrode 260. Second supply line 195 lies closer to second compensation counter-electrode 265. Rocker supply line 180 extends between first supply line 190 and second supply line 195.

A first compensation electrode 160 is arranged in z direction above first compensation counter-electrode 260. A second compensation electrode 165 is arranged in z direction above second compensation counter-electrode 265. This may be seen in FIGS. 1 and 2. Compensation electrodes 160, 165 have approximately the same shape and size as compensation counter-electrodes 260, 265. Compensation electrodes 160, 165 are surrounded on both outer sides parallel to the x direction and on one outer side parallel to the y direction by a U-shaped rocker 130 which is arranged in z direction above counter-electrodes 210, 215, 220, 225. The portion of rocker 130 oriented parallel to the y axis is not arranged above a counter-electrode but is arranged directly above insulation layer 120 and forms an additional mass 135.

First compensation electrode 160 is connected to first supply line 190 via a first post 170. Second compensation electrode 165 is connected to second supply line 195 via a second post 175. Rocker 130 is connected to a rocker post 150 via a torsion spring 140 oriented parallel to the y direction. Rocker post 150 connects torsion spring 140 to rocker supply line 180. First post 170 is arranged on the end of first compensation electrode 160 toward second compensation electrode 165. Second post 175 is arranged on the end of second compensation electrode 165 toward first compensation electrode 160. First post 170, rocker post 150 and second post 175 are thus directly adjacent. Posts 170, 150, 175 are arranged beside one another in x direction in a central region in the x-y plane of acceleration sensor 100.

Torsion spring 140 permits tilting of the rocker 130 about an axis of rotation formed by torsion spring 140.

Figure 4:
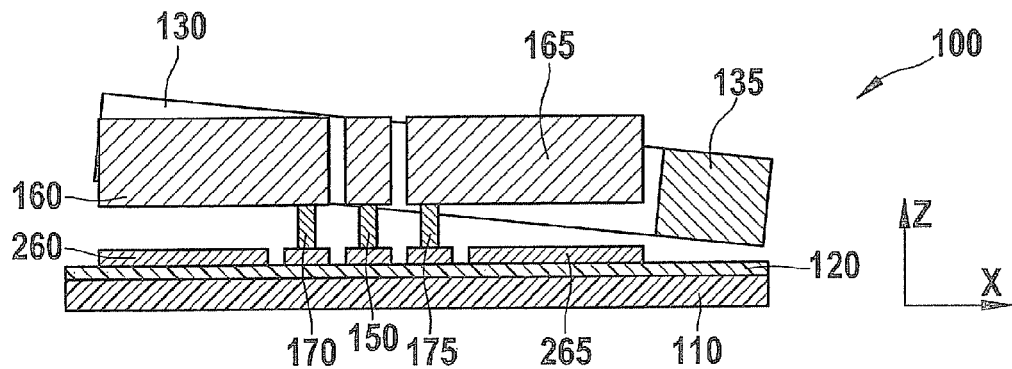
FIG. 4 shows a section through the acceleration sensor while an acceleration is acting.

Owing to additional mass 135, the mass of rocker 130 is distributed asymmetrically over both sides of torsion spring 140. As a result, an acceleration acting on acceleration sensor 100 in z direction causes tilting of rocker 130 about the axis of rotation formed by torsion spring 140. This is illustrated in FIG. 4. In the example shown in FIG. 4, an acceleration acting in the negative z direction acts on acceleration sensor 100. As a result, rocker 130 is tilted in such a manner that additional mass 135 approaches substrate surface 115.

First counter-electrode 210 and third counter-electrode 215 form together with rocker 130 a plate capacitor having a first electrical sensor capacitance C1A the magnitude of which is dependent on the distance of rocker 130 from counter-electrodes 210, 215. Second counter-electrode 220 and fourth counter-electrode 225 form together with rocker 130 a plate capacitor having a second electrical sensor capacitance C2A the magnitude of which is dependent on the distance of rocker 130 from counter-electrodes 220, 225. If an acceleration acting on acceleration sensor 100 causes tilting of rocker 130 about torsion spring 140, one of the sensor capacitances C1A, C2A increases while the other decreases. A difference between sensor capacitances C1A, C2A thus represents a measure of the magnitude of an acceleration acting on acceleration sensor 100.

Figure 5:
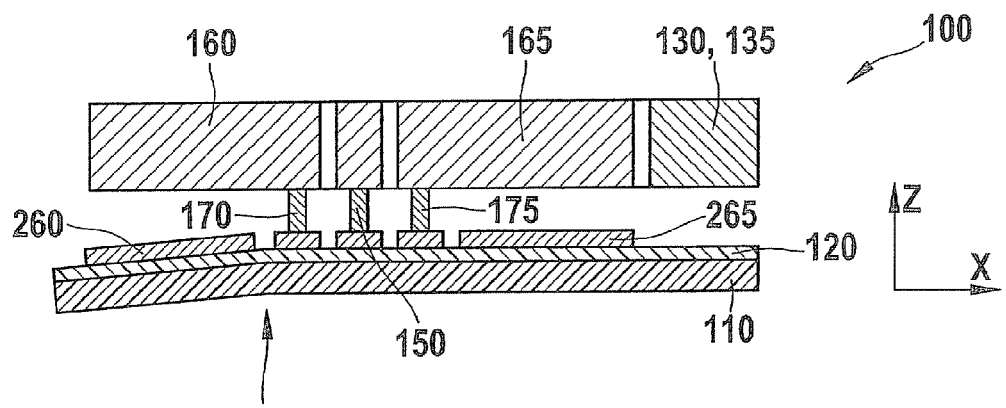
FIG. 5 shows a section through the acceleration sensor under the effect of a bending of the substrate.

FIG. 5 shows a further section through acceleration sensor 100. In the illustration in FIG. 5, substrate 110 exhibits asymmetrical bending 300 of the substrate. Bending 300 of the substrate causes the distance between counter-electrodes 210, 215 and rocker 130 to increase, as a result of which first electrical sensor capacitance C1A also changes. Since bending 300 of the substrate is asymmetrical, the distance between counter-electrodes 220, 225 and rocker 130, and thus also second electrical sensor capacitance C2A, remains unchanged. The resulting change in the difference between sensor capacitances C1A and C2A may be misinterpreted as acceleration acting in z direction. Acceleration sensor 100 is configured, however, to compensate for the effect of asymmetrical bending 300 of the substrate, as will be demonstrated below.

Second compensation counter-electrode 265 and second compensation electrode 165 form a first electrical compensation capacitance C1B the magnitude of which is dependent on the distance between second compensation counter-electrode 265 and second compensation electrode 165. First compensation counter-electrode 260 and first compensation electrode 160 form a plate capacitor having a second electrical compensation capacitance C2B the magnitude of which is dependent on the distance between first compensation counter-electrode 260 and first compensation electrode 160. First counter-electrode 210 and third counter-electrode 215 are electrically connected to second compensation counter-electrode 265. As a result, a first electrical total capacitance C1 is obtained as the sum of first electrical sensor capacitance C1A and first electrical compensation capacitance C1B. Second counter-electrode 220 and fourth counter-electrode 225 are electrically connected to first compensation counter-electrode 260. As a result, a second electrical total capacitance C2 is obtained as the sum of second electrical sensor capacitance C2A and second electrical compensation capacitance C2B.

First electrical sensor capacitance C1A may be of approximately the same magnitude as second electrical sensor capacitance C2A. In addition, first electrical compensation capacitance C1B may be of approximately the same magnitude as second electrical compensation capacitance C2B. In a resting state of acceleration sensor 100, in which no acceleration is acting on acceleration sensor 100, a difference between first electrical total capacitance C1 and second electrical total capacitance C2 is then by approximation equal to 0.

In the case illustrated in FIG. 4 of an acceleration acting on acceleration sensor 100 in z direction, the distances between rocker 130 and counter-electrodes 210, 215, 220, 225 change, as a result of which, as already explained, sensor capacitances C1A, C2A change with opposite signs. The distances between compensation electrodes 160, 165 and compensation counter-electrodes 260, 265 remain unchanged, however, as a result of which compensation capacitances C1B, C2B also remain constant. Consequently, the difference between first electrical total capacitance C1 and second electrical total capacitance C2 changes to a value not equal to 0 that represents a measure of the magnitude and direction of the acceleration acting on acceleration sensor 100.

In the case illustrated in FIG. 5 of asymmetrical bending 300 of the substrate, both the distance between counter-electrodes 210, 215 and rocker 130 and the distance between first compensation counter-electrode 260 and first compensation electrode 160 changes. As a result, first electrical sensor capacitance C1A and second electrical compensation capacitance C2B are reduced by approximately equal values, for example a value dV. First electrical total capacitance C1 then becomes C1=C1A−dV+C1B, whereas second total capacitance C2 becomes C2=C2A+C2B−dV. The difference between total capacitances C1 and C2 thus remains unchanged at approximately equal to 0. As a result, bending 300 of the substrate is not misinterpreted as acceleration acting in z direction.

Counter-electrodes 210, 215, 220, 225 and compensation counter-electrodes 260, 265 may, for example, be connected to an evaluation circuit, not illustrated in the Figures, which performs the described evaluation of the total capacitances C1, C2.

The arrangement of counter-electrodes 210, 215, 220, 225 and compensation counter-electrodes 260, 265 illustrated in FIG. 3 is able to compensate completely for an asymmetrical bending of substrate 110 acting purely in x direction. By virtue of the fact that counter-electrodes 210, 215 are adjacent to first compensation counter-electrode 260 on the two sides in y direction and second compensation counter-electrode 265 is arranged in y direction between second counter-electrode 220 and fourth counter-electrode 225, it is also possible to compensate partly for asymmetrical bending of substrate 110 acting in y direction. In order to achieve complete compensation in y direction also, the segmentation of counter-electrodes 210, 215, 220, 225 may be further increased. This is illustrated in FIGS. 6 and 7.

Figure 6:
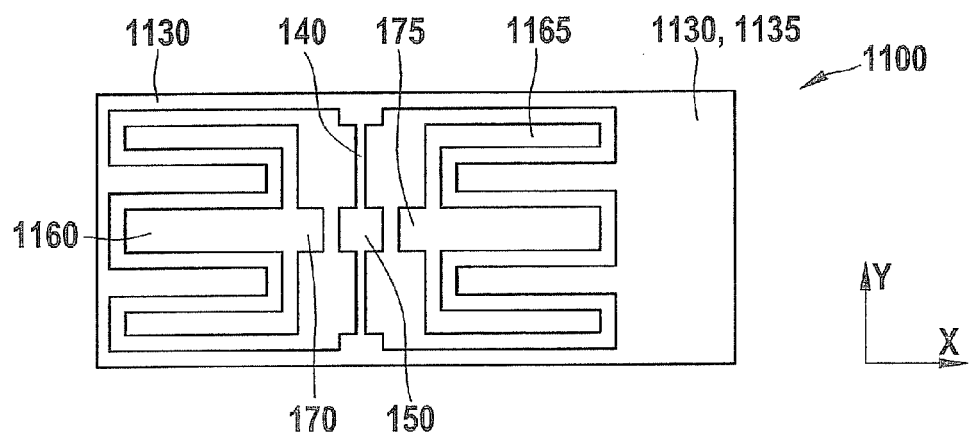
FIG. 6 is a plan view of an acceleration sensor in accordance with a second embodiment.
Figure 7:
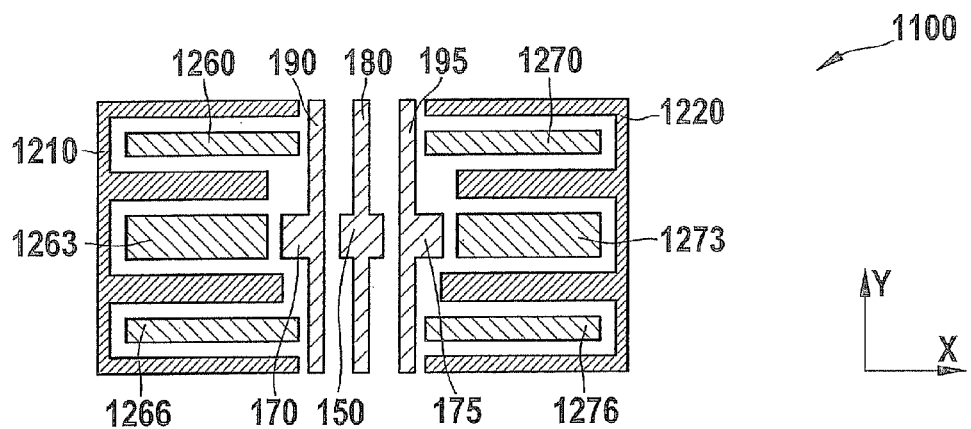
FIG. 7 shows a section through the accelerations sensor of the second embodiment.

FIG. 6 shows a plan view of an acceleration sensor 1100 in accordance with a second embodiment. FIG. 7 shows, in a section parallel to the x-y plane, the electrodes of acceleration sensor 1100 which are connected to substrate 110. Acceleration sensor 1100 has, connected to substrate 110, a third compensation counter-electrode 1260, a fourth compensation counter-electrode 1263, a fifth compensation counter-electrode 1266, a sixth compensation counter-electrode 1270, a seventh compensation counter-electrode 1273 and an eighth compensation counter-electrode 1276. In addition, acceleration sensor 1100 has, fixedly connected to the substrate, a third counter-electrode 1210 and a fourth counter-electrode 1220. Third counter-electrode 1210 is configured like a comb with four parallel teeth. Third, fourth and fifth compensation counter-electrodes 1260, 1263 and 1266 are arranged in succession in y direction between the parallel teeth of third counter-electrode 1210. Fourth counter-electrode 1220 is configured symmetrically to third counter-electrode 1210 in terms of a mirroring at a mirror plane parallel to the y axis. Sixth, seventh and eighth compensation counter-electrode 1270, 1273, 1276 are arranged between the teeth of fourth counter-electrode 1220. Between third and fourth counter-electrode 1210, 1220, rocker supply line 180, first supply line 190 and second supply line 195 again run parallel to the y axis.

In z direction above third, fourth and fifth compensation counter-electrodes 1260, 1263, 1266, a third compensation electrode 1160 is arranged. In z direction above sixth, seventh and eighth compensation counter-electrodes 1270, 1273, 1276, a fourth compensation electrode 1165 is arranged. Third compensation electrode 1160 is connected to substrate 110 via first post 170. Fourth compensation electrode 1165 is connected to substrate 110 via second post 175. In z direction above third counter-electrode 1210 and fourth counter-electrode 1220, a rocker 1130 is arranged which is connected to substrate 110 via torsion spring 140 and rocker post 150. Rocker 1130 has an additional mass 1135 which causes the mass of rocker 1130 to be distributed asymmetrically with respect to torsion spring 140.

Compensation electrodes 1160, 1165 and rocker 1130 each have comb-like teeth which mesh with one another. That segmentation of compensation counter-electrodes 1260, 1263, 1266 and the corresponding segmentation of compensation counter-electrodes 1270, 1273, 1276 each into three portions improves the compensation ability of acceleration sensor 1100 with respect to asymmetrical bending of substrate 110 in y direction. In further embodiments, not shown, the counter-electrodes and compensation counter-electrodes fixed to the substrate may be further segmented and meshed with one another. For example, segmentation of the counter-electrodes may also be effected in x direction. The segmentation of the counter-electrodes may also be adapted to a special housing to be used for acceleration sensor 110, 1100 and to a bending of substrate 110 caused by that housing.

Figure 8:
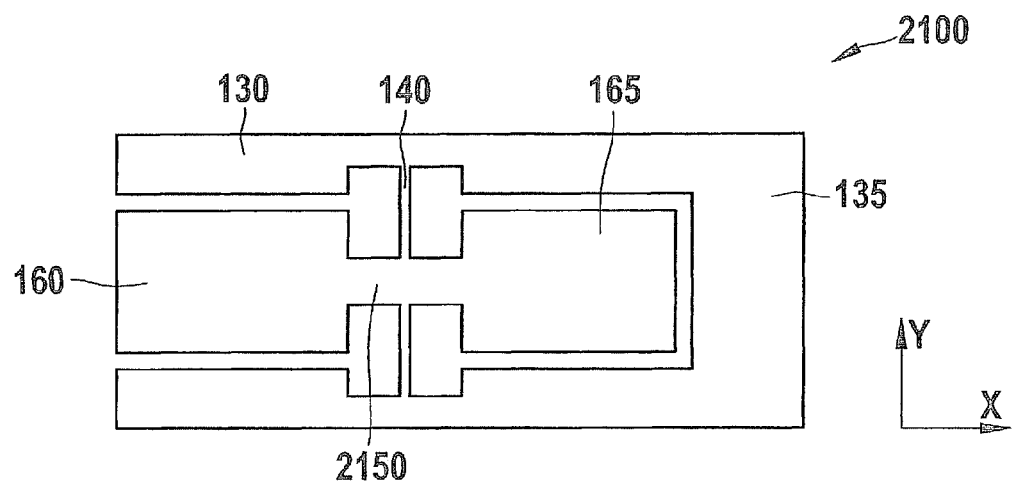
FIG. 8 is a plan view of an acceleration sensor in accordance with a third embodiment.
Figure 9:
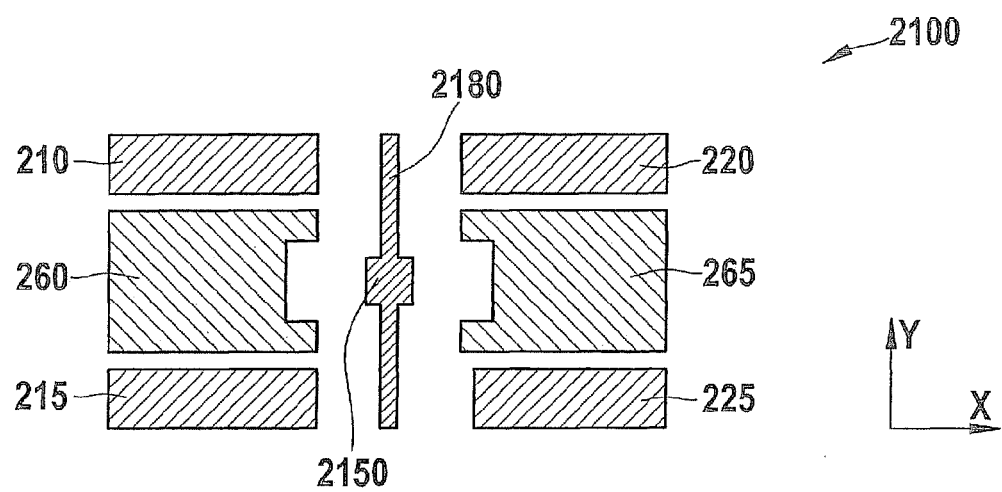
FIG. 9 shows a section through the acceleration sensor of the third embodiment.

FIGS. 8 and 9 show an acceleration sensor 2100 in accordance with a third embodiment. FIG. 9 shows, in a section parallel to the x-y plane, the counter-electrodes of acceleration sensor 2100 which are fixedly connected to the substrate. FIG. 8 shows, in a plan view, compensation electrodes 160, 165 arranged in z direction above compensation counter-electrodes 260, 265, and rocker 130 arranged in z direction above counter-electrodes 210, 215, 220, 225. In contrast to the embodiment of FIGS. 1 to 3, acceleration sensor 2100 has only one supply line 2180 and one suspension post 2150. Suspension post 2150 connects both first compensation electrode 160 and second compensation electrode 165 to supply line 2180. In addition, suspension post 2150 connects rocker 130 to supply line 2180 via torsion spring 140. Acceleration sensor 2100 thereby only permits compensation electrodes 160, 165 and rocker 130 to be kept to a common potential. In many applications, however, that does not represent any limitation. One advantage of the embodiment of acceleration sensor 2100 is the common suspension via suspension post 2150. In that manner it is guaranteed that the position of compensation electrodes 160, 165 does not change relative to the position of rocker 130 in the case of asymmetrical bending of substrate 110 in z direction.

The disclosed acceleration sensors 100, 1100, 2100 have a reduced sensitivity toward stress effects manifested in asymmetrical bending of substrate 110. Such stress effects may, for example, be caused by a housing of acceleration sensor 100, 1100, 2100. The reduced sensitivity toward stress effects permits the use of housings that exert higher stress effects on acceleration sensor 100, 1100, 2100 but which in return are cheaper.

What is claimed is:

1. A micromechanical acceleration sensor, comprising:
    a substrate having a substrate surface arranged in one plane;
    a first counter-electrode arranged on the substrate surface;
    a second counter-electrode arranged on the substrate surface;
    a rocking mass arranged above the first counter-electrode and the second counter-electrode, wherein the rocking mass is connected to the substrate via a torsion spring, the torsion spring permitting tilting of the rocking mass about an axis of rotation;
    a first compensation counter-electrode arranged on the substrate surface and a second compensation counter-electrode arranged on the substrate surface;
    a first compensation electrode arranged above the first compensation counter-electrode; and
    a second compensation electrode arranged above the second compensation counter-electrode, wherein the first compensation electrode and the second compensation electrode are rigidly connected to the substrate.

2. The micromechanical acceleration sensor of claim 1, wherein the first counter-electrode is electrically connected to the second compensation counter-electrode, and the second counter-electrode is electrically connected to the first compensation counter-electrode.

3. The micromechanical acceleration sensor of claim 1, wherein the first compensation electrode is connected to the substrate via a first post at an end of the first compensation electrode toward the torsion spring, and the second compensation electrode is connected to the substrate via a second post at an end of the second compensation electrode toward the torsion spring.

4. The micromechanical acceleration sensor of claim 1, wherein the torsion spring, the first compensation electrode and the second compensation electrode are connected to the substrate at a common suspension post.

5. The micromechanical acceleration sensor of claim 1, further comprising:
    at least one of a plurality of first counter-electrodes and a plurality of first compensation counter-electrodes.

6. A micromechanical acceleration sensor, comprising:
    a substrate having a substrate surface arranged in one plane;
    a first counter-electrode arranged on the substrate surface;
    a second counter-electrode arranged on the substrate surface;
    a rocking mass arranged above the first counter-electrode and the second counter-electrode, wherein the rocking mass is connected to the substrate via a torsion spring, the torsion spring permitting tilting of the rocking mass about an axis of rotation;
    a first compensation counter-electrode arranged on the substrate surface and a second compensation counter-electrode arranged on the substrate surface;
    a first compensation electrode arranged above the first compensation counter-electrode; and
    a second compensation electrode arranged above the second compensation counter-electrode, wherein the first compensation electrode and the second compensation electrode are configured symmetrically to each other in terms of a mirroring at the torsion spring.

7. A micromechanical acceleration sensor, comprising:
    a substrate having a substrate surface arranged in one plane;
    a first counter-electrode arranged on the substrate surface;

a second counter-electrode arranged on the substrate surface;

a rocking mass arranged above the first counter-electrode and the second counter-electrode, wherein the rocking mass is connected to the substrate via a torsion spring, the torsion spring permitting tilting of the rocking mass about an axis of rotation;

a first compensation counter-electrode arranged on the substrate surface and a second compensation counter-electrode arranged on the substrate surface;

a first compensation electrode arranged above the first compensation counter-electrode; and a second compensation electrode arranged above the second compensation counter-electrode, wherein the first compensation counter-electrode and the second compensation counter-electrode are configured symmetrically to each in terms of a mirroring at the torsion spring.

8. A micromechanical acceleration sensor, comprising:

a substrate having a substrate surface arranged in one plane;

a first counter-electrode arranged on the substrate surface;

a second counter-electrode arranged on the substrate surface;

a rocking mass arranged above the first counter-electrode and the second counter-electrode, wherein the rocking mass is connected to the substrate via a torsion spring, the torsion spring permitting tilting of the rocking mass about an axis of rotation;

a first compensation counter-electrode arranged on the substrate surface and a second compensation counter-electrode arranged on the substrate surface;

a first compensation electrode arranged above the first compensation counter-electrode; and a second compensation electrode arranged above the second compensation counter-electrode, wherein without an acceleration acting on the acceleration sensor, a first electrical sensor capacitance between the rocking mass and the first counter-electrode is of approximately the same magnitude as a first electrical compensation capacitance between the second compensation electrode and the second compensation counter-electrode, and wherein a second electrical sensor capacitance between the rocking mass and the second counter-electrode is of approximately the same magnitude as a second electrical compensation capacitance between the first compensation electrode and the first compensation counter-electrode.

9. The micromechanical acceleration sensor of claim 8, wherein the acceleration sensor is connectable to an evaluation circuit which is configured to calculate a difference between a sum of the first electrical sensor capacitance and the first electrical compensation capacitance and a sum of the second electrical sensor capacitance and the second electrical compensation capacitance.

10. A micromechanical acceleration sensor, comprising:

a substrate having a substrate surface arranged in one plane;

a first counter-electrode arranged on the substrate surface;

a second counter-electrode arranged on the substrate surface;

a rocking mass arranged above the first counter-electrode and the second counter-electrode, wherein the rocking mass is connected to the substrate via a torsion spring, the torsion spring permitting tilting of the rocking mass about an axis of rotation;

a first compensation counter-electrode arranged on the substrate surface and a second compensation counter-electrode arranged on the substrate surface;

a first compensation electrode arranged above the first compensation counter-electrode; and a second compensation electrode arranged above the second compensation counter-electrode, wherein the rocking mass partially surrounds the first compensation electrode.

11. A method for operating a micromechanical acceleration sensor, the method comprising:

calculating a first electrical sensor capacitance from a first pair of counter-electrodes arranged on a substrate to form a first plate capacitor with a rocking mass arranged above the first counter-electrode pair and connected to the substrate via a torsion spring permitting tilting of the rocking mass about an axis of rotation;

calculating a second electrical sensor capacitance from a second pair of counter-electrodes arranged on the substrate to form a second plate capacitor with the rocking mass;

calculating a first electrical compensation capacitance from a first compensation counter-electrode arranged on the substrate and a first compensation electrode arranged above the first compensation counter-electrode;

calculating a second electrical compensation capacitance from a second compensation counter-electrode arranged on the substrate and a second compensation electrode arranged above the second compensation counter-electrode;

summing the first electrical sensor capacitance and the first electrical compensation capacitance;

summing the second electrical sensor capacitance and the second electrical compensation capacitance;

calculating a difference between the sums; and determining a magnitude and a direction of an acceleration acting on the acceleration sensor based on the amount and sign of the difference.

12. A method for operating a micromechanical acceleration sensor, the method comprising:

calculating a first electrical sensor capacitance from a first pair of counter-electrodes arranged on a substrate to form a first plate capacitor with a rocking mass arranged above the first counter-electrode pair and connected to the substrate via a torsion spring permitting tilting of the rocking mass about an axis of rotation;

calculating a second electrical sensor capacitance from a second pair of counter-electrodes arranged on the substrate to form a second plate capacitor with the rocking mass;

calculating a first electrical compensation capacitance from a first compensation counter-electrode arranged on the substrate and a first compensation electrode arranged above the first compensation counter-electrode;

calculating a second electrical compensation capacitance from a second compensation counter-electrode arranged on the substrate and a second compensation electrode arranged above the second compensation counter-electrode;

summing the first electrical sensor capacitance and the first electrical compensation capacitance;

summing the second electrical sensor capacitance and the second electrical compensation capacitance;

calculating a difference between the sums; and determining a magnitude and a direction of an acceleration acting on the acceleration sensor based on the amount and sign of the difference, wherein the first compensation electrode and the second compensation electrode are configured symmetrically to each other in terms of a mirroring at the torsion spring.

13. A method for operating a micromechanical acceleration sensor, the method comprising:

- calculating a first electrical sensor capacitance from a first pair of counter-electrodes arranged on a substrate to form a first plate capacitor with a rocking mass arranged above the first counter-electrode pair and connected to the substrate via a torsion spring permitting tilting of the rocking mass about an axis of rotation;
- calculating a second electrical sensor capacitance from a second pair of counter-electrodes arranged on the substrate to form a second plate capacitor with the rocking mass;
- calculating a first electrical compensation capacitance from a first compensation counter-electrode arranged on the substrate and a first compensation electrode arranged above the first compensation counter-electrode;
- calculating a second electrical compensation capacitance from a second compensation counter-electrode arranged on the substrate and a second compensation electrode arranged above the second compensation counter-electrode;
- summing the first electrical sensor capacitance and the first electrical compensation capacitance;
- summing the second electrical sensor capacitance and the second electrical compensation capacitance;
- calculating a difference between the sums; and
- determining a magnitude and a direction of an acceleration acting on the acceleration sensor based on the amount and sign of the difference, wherein the first compensation counter-electrode and the second compensation counter-electrode are configured symmetrically to each in terms of a mirroring at the torsion spring.

14. A method for operating a micromechanical acceleration sensor, the method comprising:

- calculating a first electrical sensor capacitance from a first pair of counter-electrodes arranged on a substrate to form a first plate capacitor with a rocking mass arranged above the first counter-electrode pair and connected to the substrate via a torsion spring permitting tilting of the rocking mass about an axis of rotation;
- calculating a second electrical sensor capacitance from a second pair of counter-electrodes arranged on the substrate to form a second plate capacitor with the rocking mass;
- calculating a first electrical compensation capacitance from a first compensation counter-electrode arranged on the substrate and a first compensation electrode arranged above the first compensation counter-electrode;
- calculating a second electrical compensation capacitance from a second compensation counter-electrode arranged on the substrate and a second compensation electrode arranged above the second compensation counter-electrode;
- summing the first electrical sensor capacitance and the first electrical compensation capacitance;
- summing the second electrical sensor capacitance and the second electrical compensation capacitance;
- calculating a difference between the sums; and determining a magnitude and a direction of an acceleration acting on the acceleration sensor based on the amount and sign of the difference, wherein without an acceleration acting on the acceleration sensor, (i) the first electrical sensor capacitance is of approximately a same magnitude as the first electrical compensation capacitance, and (ii) the second electrical sensor capacitance is of approximately a same magnitude as the second electrical compensation capacitance.

* * * * *